United States Patent [19]

Cribb

[11] Patent Number: 4,807,388
[45] Date of Patent: Feb. 28, 1989

[54] FISHING LURE TUNING MECHANISM

[76] Inventor: Harry L. Cribb, Rte. 13, Box 434, Florence, S.C. 29501

[21] Appl. No.: 209,206

[22] Filed: Jun. 20, 1988

[51] Int. Cl.⁴ .......................................... A01K 85/00
[52] U.S. Cl. ............................... 43/42.22; 43/42.23; 43/42.47; 43/42.49
[58] Field of Search ............... 43/42.03, 42.22, 42.23, 43/42.47, 42.49

[56] References Cited

U.S. PATENT DOCUMENTS

| | | | |
|---|---|---|---|
| 3,874,109 | 4/1975 | Peterson | 43/42.22 |
| 3,971,154 | 7/1976 | Craig | 43/43.23 |
| 4,006,552 | 2/1977 | Cunningham | 43/42.49 |
| 4,215,507 | 8/1980 | Russell | 43/42.22 |
| 4,492,054 | 1/1985 | Barnhart | 43/42.22 |

Primary Examiner—Nicholas P. Godici
Assistant Examiner—William Scott Andes
Attorney, Agent, or Firm—Bailey & Hardaway

[57] ABSTRACT

A tuning mechanism is provided for a fishing lure allowing for predictable control of the path traveled by the lure permitting the user to cause the lure to swim to the left or the right as it is retrieved.

6 Claims, 2 Drawing Sheets

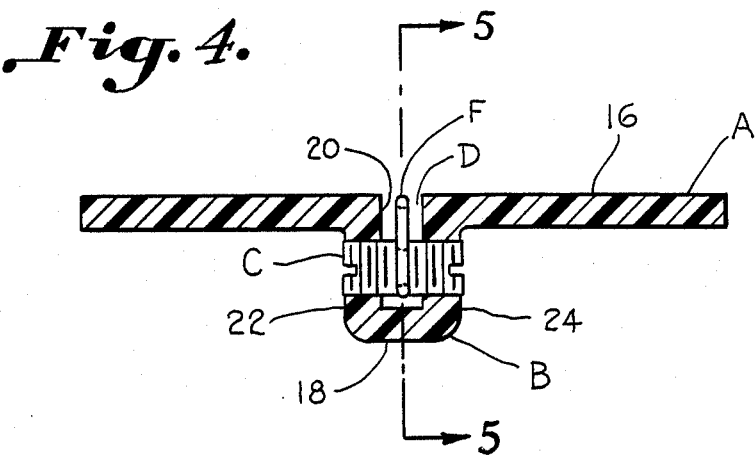
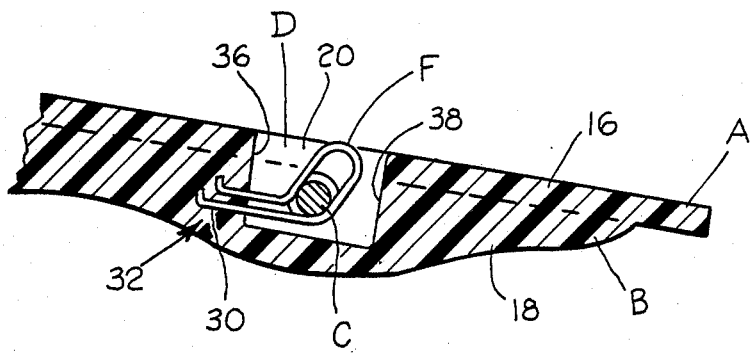
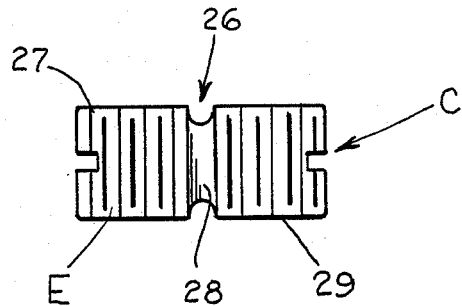

FISHING LURE TUNING MECHANISM

BACKGROUND OF THE INVENTION

Numerous fishing lures have been taught which provide the user with the ability to impart an erratic or vibrant lure path. One such device is disclosed by Barnhart in U.S. Pat. No. 4,492,054. However, in order to control the lateral motion of the lure, fishermen have been required to bend the eye hook to the left or to the right to make the lure swim to the left or to the right, respectively, as it is retrieved. This is commonly referred to as tuning the lure. The process often involves over-bending the eye with pliers and then correcting the bend by trial and error until a desired lure path is achieved. Excessive manipulation of the eye hook weakens the metal material. Peterson in U.S. Pat. No. 3,874,109 teaches an alternative method of tuning a lure. His device includes a forward beak portion which is bent to regulate the path of the lure. However, this method is subject to the shortcomings of the method discussed above. That is, the lure must be tuned by trial and error and excessive bending of the beak portion eventually weakens it.

An important object of the invention, therefore, is the provision of a lure which can be set by the user to follow a controlled path upon retrieval.

Another object of the present invention is the provision of a lure which is designed to be set by the user to swim to the left or to the right without requiring the deformation of any part of the lure.

A further object of the present invention is the provision of a tuning mechanism for a fishing lure which may be set precisely to follow a predictable path, not requiring trial and error to achieve that path.

SUMMARY OF THE INVENTION

It has been found that a fishing lure may be provided with a tuning mechanism housed in a receptacle formed by a recess in the spoon and a downwardly protruding plate having a screw carried in the plate perpendicular to the spoon, a head carried by the screw on each of the two opposed ends, an eye hook carried by a center portion of the screw extending upwardly from the screw, means for moving the eye hook laterally within the receptacle, means for restraining rotational movement of the eye hook, so that the eye hook may be positioned laterally with respect to the spoon and the lure body.

BRIEF DESCRIPTION OF THE DRAWINGS

FIG. 4 is a transverse sectional elevation along the line 4—4 of FIG. 3.

FIG. 5 is a longitudinal sectional elevation of the lure taken along line 5—5 of FIG. 4.

FIG. 6 is an elevation of one embodiment of the screw of this invention.

DESCRIPTION OF THE PREFERRED EMBODIMENT

Figure 1:
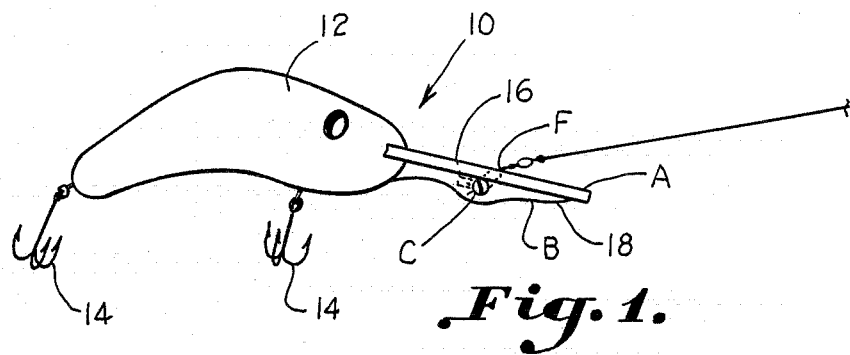
FIG. 1 is an elevation of a fishing lure in accordance with this invention.
Figure 2:
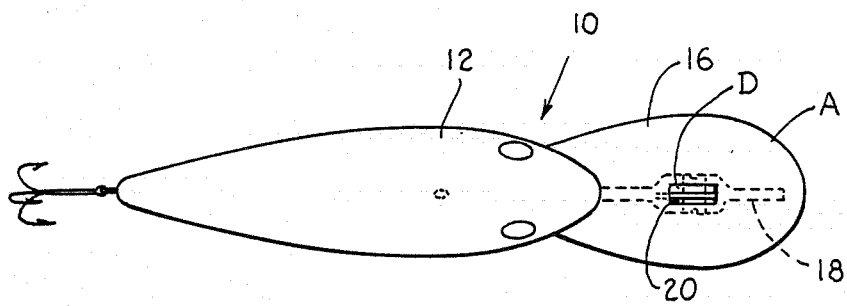
FIG. 2 is a top plan view of the fishing lure of FIG. 1.

A fishing lure having a body, hooks attached to the body, and a forwardly extending horizontal spoon A is provided with a plate B extending vertically downwardly from a central portion of the spoon and a screw C carried in the plate beneath and perpendicular to the spoon. A receptacle D is formed by a transverse recess in the horizontal spoon, extending vertically downwardly into the plate about the screw. A head E may be carried by the screw on each of two opposed ends so that adjustment of the screw at either head causes the screw to move laterally within the plate. An eye hook F, carried by a center portion of the screw, extends upwardly in the receptacle through the plate and the spoon and protrudes upwardly from the screw. The eye hook moves laterally within the receptacle responsive to the lateral movement of the screw but is restrained from fully rotating responsive to the helical movement of the screw. Thus, the path traveled by the lure as it is retrieved may be controlled responsive to the lateral disposition of the eye hook.

Referring to the drawings, a fishing lure 10 is illustrated as having a body 12 with hooks 14 attached thereto. A spoon 16 protrudes forwardly from the lure with a plate 18 extending downwardly from the spoon. A transverse receptacle 20 is defined through a middle portion of the spoon down into the plate 18. Screw C is carried by outer walls 22 and 24 of the plate 18 with a center portion 26 of the screw disposed in receptacle 20. FIG. 6 best illustrates opposed heads 27 and 29 of screw C which are substantially disposed in side walls 22 and 24 of the plate 18 as shown in FIG. 4. Center portion 26 includes groove 28 which carries eye hook F as shown in FIGS. 4 and 5. A base portion 30 of eye hook F is anchored in plate 18 as shown at 32.

Figure 3:
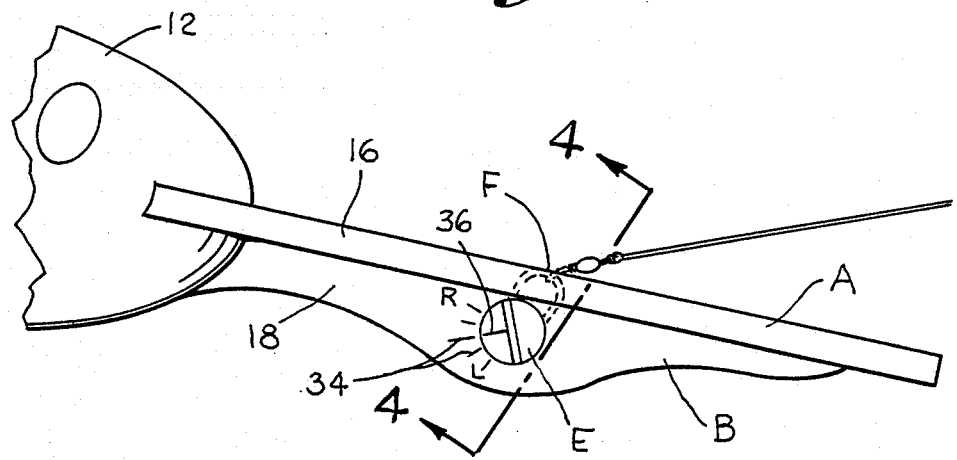
FIG. 3 is an enlarged elevation of a portion of the fishing lure of FIG. 1 illustrating the spoon and lip of the invention.

Plate 18 and head 27 include indicia 34 and 36 as shown in FIG. 3. Adjustment of screw C at head 27 in accordance with indicia 34 indicates the direction and degree of lateral movement of the screw. As eye hook F is carried in groove 28 of the screw, adjustments made at head 27 in accordance with indicia 34 also determine the direction and degree of the lateral movement of the eye hook. That is, a sufficiently snug fit of eye hook F in groove 28 insures that the eye hook moves laterally with the screw. However, that fit must be sufficiently loose to prevent eye hook F from rotating responsive to the helical movement of screw C. Such rotational movement of the eye hook about a center axis of screw C is additionally prevented because base portion 30 is anchored in plate 18 as shown at 32 and inner walls 36 and 38 of receptacle 20 as abutments. Preferably, the projection of the eye hook above the center of the screw should be as small as possible to avoid possible accidental bending of the eye hook.

Thus, adjustments at either head of screw C allow the user to laterally displace the eye hook from the center of the lure body. Although not illustrated, it is to be understood that such a receptacle and screw combination could be adapted to a lure not having a spoon and plate but having the eye hook attached to the body of the lure. That is, the main object of the invention is the provision of means for easily and predictably moving the eye hook off center. It has been found that the path of the lure is controllable responsive to the lateral disposition of the eye hook.

It is thus seen that this invention provides a novel lure structure and particularly provides an improvement by allowing the user to predictably set the lateral disposition of the eye hook relative to the lure without risk of eventual material wear. As many variations will become apparent from a reading of the foregoing descriptions such variations are embodied within the spirit and scope of the following appended claims.

That which is claimed is:

1. A fishing lure having a body with a longitudinal axis, hooks attached to said body, and a forwardly extending horizontal spoon extending outwardly from the body along the longitudinal axis comprising:
   a plate extending vertically downwardly from a central portion of the spoon;
   a screw carried in the plate beneath and perpendicular to the longitudinal axis of the spoon;
   a receptacle formed by a transverse recess defined in the horizontal spoon extending vertically downwardly into the plate about the screw;
   a head carried by said screw on at least one of two opposed ends;
   an eye hook carried by a central portion of said screw extending upwardly in the receptacle through the plate and the spoon and protruding upwardly from the spoon;
   means moving said eye hook laterally across the longitudinal axis from one position to at least one another position within said receptacle responsive to lateral movement of the screw; and
   means restraining said eye hook from fully rotating responsive to helical movement of the screw allowing for lateral positioning of the eye hook with respect to the spoon and the body;
   whereby a path traveled by the lure as the lure is retrieved is changed by the position of said eye hook.

2. The fishing lure set forth in claim 1 including indicia on the plate for correspondence with indicia on a head of the screw indicating degree and direction of lateral movement of the eye hook within the receptacle.

3. The fishing lure set forth in claim 1 wherein said means restraining rotational movement of the eye hook includes anchorage of a base portion of the eye hook within the plate.

4. The fishing lure set forth in claim 1 wherein said means restraining rotational movement of the eye hook includes an abutment defined by said spoon at an upper portion of said, receptacle.

5. The fishing lure set forth in claim 1 including a second head carried by said screw on another of said two opposed ends so that adjustment of the screw at either head causes the screw to move laterally within the plate.

6. A fishing lure having a body with a longitudinal axis and having a longitudinal vertical portion comprising:
   a transverse screw extending across the longitudinal axis and carried in the vertical portion;
   a receptacle formed by a recess defined in the lure extending vertically downwardly about the screw;
   a head carried by said screw on at least one of two opposed ends;
   an eye hook carried by said screw extending upwardly in the receptacle through the vertical portion and protruding upwardly from the lure;
   means moving said eye hook laterally within said receptacle responsive to turning of the screw; and
   means restraining said eye hook from fully rotating responsive to helical movement of the screw allowing for lateral positioning of the eye hook with respect to the body;
   whereby the path traveled by the lure as the lure is retrieved may be controlled responsive to the lateral disposition of said eye hook.

* * * * *